United States Patent
Kwak et al.

(10) Patent No.: US 8,792,536 B2
(45) Date of Patent: Jul. 29, 2014

(54) REPEATER USING DIGITAL FILTER AND METHOD FOR DIGITAL FILTERING USING THE SAME

(75) Inventors: Min Kon Kwak, Seoul (KR); Sang Jun Kim, Bucheon-si (KR); You Sik Choi, Seoul (KR); Pil Kyu Jin, Gyeonngi-do (KR); Se Woong Park, Seoul (KR)

(73) Assignee: R-Tron Inc, Seoul (KR)

( * ) Notice: Subject to any disclaimer, the term of this patent is extended or adjusted under 35 U.S.C. 154(b) by 130 days.

(21) Appl. No.: 13/526,666

(22) Filed: Jun. 19, 2012

(65) Prior Publication Data

US 2013/0177047 A1 Jul. 11, 2013

(30) Foreign Application Priority Data

Jan. 10, 2012 (KR) .................. 10-2012-0002964

(51) Int. Cl.
*H04B 17/02* (2006.01)
(52) U.S. Cl.
USPC ........... 375/211; 375/316; 375/362; 370/203; 370/503; 370/343; 455/307
(58) Field of Classification Search
USPC .......................................... 375/211; 455/307
See application file for complete search history.

(56) References Cited

U.S. PATENT DOCUMENTS

2005/0190822 A1* 9/2005 Fujii et al. ............... 375/211
2013/0273871 A1* 10/2013 Kravets ................... 455/307

FOREIGN PATENT DOCUMENTS

| JP | 4603462 | 10/2010 |
| KR | 100892619 B1 | 4/2009 |
| KR | 1020090110669 A | 10/2009 |

* cited by examiner

*Primary Examiner* — Eva Puente
(74) *Attorney, Agent, or Firm* — Amin, Turocy & Watson, LLP

(57) ABSTRACT

A repeater using a digital filter is disclosed. The repeater comprises a MUX filter for filtering an RF signal received through an antenna or a signal to be transmitted through the antenna; a low noise amplifier for lowering noise of the signal filtered by the MUX filter; a down converter for converting the signal outputted from the low noise amplifier into an IF band signal to digitalize the signal; a digital filter for filtering the digital signal outputted form the down converter based on parameters inputted by a user; a filtering controller for controlling the digital filter by using a filtering coefficient calculated based on the parameters; an up converter for converting the signal filtered by the digital filter into an RF band signal; and a high power amplifier for amplifying the signal outputted from the up converter to a high power signal.

9 Claims, 4 Drawing Sheets

REPEATER USING DIGITAL FILTER AND METHOD FOR DIGITAL FILTERING USING THE SAME

CROSS-REFERENCE TO RELATED APPLICATION

This application claims the benefit of Korean Patent Application No. 10-2012-0002964 filed on Jan. 10, 2012, the entire disclosures of which are incorporated herein by reference.

FIELD OF THE INVENTION

The present disclosure relates to a repeater using a digital filter and a digital filtering method using the same.

BACKGROUND OF THE INVENTION

A repeater was developed to improve the call quality in mobile communication and overcome a communication blind zone, and has been installed over various areas. The repeater provides a communication service to areas blocked or isolated from the outside, by filtering and amplifying signals depending on different frequency bands.

For example, in Korea, frequencies are allocated in a unit of 10 MHz to communication service providers. Seven (7) frequency channels are operated within an allocated frequency band. For example, if a communication service provider A uses a band of 20 MHz, and a communication service provider B uses a band of 10 MHz, a mobile communication repeater has a standard to execute filtering depending on the different frequency bands.

Korean Patent Application Publication No. 10-2009-0110669 (title of the invention: Repeater Variable Gain Ripple Compensation Circuit, Repeater Variable Gain Ripple Compensation Apparatus, and Method Thereof) describes a repeater configured by a ripple compensation circuit using an analog method in adjusting a frequency, the number of channels, and a bandwidth. If the ripple compensation circuit is used, it is necessary to manufacture a repeater having a fixed frequency, the fixed number of channels, and a fixed bandwidth. Thus, if a frequency band in a place or an area where the repeater is installed is changed, the repeater needs to be replaced or an inner circuit of the repeater needs to be constructed again.

In order to avoid the unnecessary works, a repeater capable of adjusting a frequency, the number of channels, and a bandwidth by adding a compensation circuit has been manufactured. However, since an analog circuit is added, the volume of the repeater and manufacturing costs thereof increase. Thus, there has been a difficulty in effectively constructing a repeater.

In order to solve the problems of the increase in volume and manufacturing costs caused by the change in the inner circuit of the repeater, Korean Patent No. 10-0892619 (title of the invention: Digital Filter Apparatus of Mobile Communication Repeater Channel Frequency Using Time-Division Filtering Method) describes a repeater, in which a ripple compensation circuit is replaced with a digital filter. However, the repeater using the digital filter is embodied in the manner that fixed frequency information, information of the fixed number of channels, and fixed bandwidth information are pre-stored in a memory of a digital board and taken therefrom. Since the information should be pre-stored in the memory of the digital board, if a multiple number of communication service providers operate frequency channels with different frequencies, different numbers of channels, and different bandwidths depending on areas, it is necessary to develop a multiple number of equipments suitable for frequency characteristics of the respective communication service providers.

BRIEF SUMMARY OF THE INVENTION

The present disclosure has been created to solve the above-described problems. To the end, the present disclosure provides a repeater using a digital filter and a digital filtering method, wherein a user directly inputs parameters of a bandwidth, a frequency, and the number of channels to GUI and carries out calculation using an algorithm and a calculation function stored in a coefficient storage unit of the digital filter so that a bandwidth, a frequency, and the number of channels, which are desired by the user, are filtered.

In view of the foregoing, there is provided a repeater using a digital filter in accordance with a first aspect of an illustrative embodiment. The repeater includes a MUX filter for filtering an RF signal received through an antenna or a signal to be transmitted through an the antenna; a low noise amplifier for lowering noise of the signal filtered by the MUX filter; a down converter for converting the signal outputted from the low noise amplifier into an IF band signal to digitalize the signal; a digital filter for filtering the digital signal outputted forom the down converter based on parameters inputted by a user; a filtering controller for controlling the digital filter by using a filtering coefficient calculated based on the parameters; an up converter for converting the signal filtered by the digital filter into an RF band signal; and a high power amplifier for amplifying the signal outputted from the up converter to a high power signal, wherein the filtering controller adjusts a bandwidth, a center frequency, and the number of channels of a digital signal to be filtered based on bandwidth information, frequency information, and the number of channels, which are inputted by the user.

Further, there is provided a digital filtering method in accordance with a second aspect of an illustrative embodiment. The digital filtering method includes calculating a filter coefficient based on parameters inputted by a user; filtering an input RF signal in an FIR filter using the calculated filter coefficient; calculating a ripple coefficient of the signal filtered from the FIR filter; and filtering a ripple with a ripple filter using the calculated ripple coefficient, wherein the calculating the filter coefficient comprises calculating the filter coefficient in a coefficient calculation unit based on at least one parameter of a bandwidth, a frequency, and the number of channels, which are inputted by a user through GUI.

In accordance with the illustrative embodiment, it is possible to filter a bandwidth, a frequency, and the number of channels, which are desired by a user, by executing filtering using parameters inputted by the user.

By using the down converter and the up converter, it is possible to easily convert an analog signal into a digital signal and a digital signal into an analog signal.

In accordance with the illustrative embodiment, by using the FIR filter, it is possible to filter a signal for a filter coefficient value based on parameters inputted by the outside through GUI.

By using the ripple filter, it is possible to filter a signal for a ripple coefficient value based on parameters inputted by the outside through GUI.

DETAILED DESCRIPTION OF THE INVENTION

Figure 1:
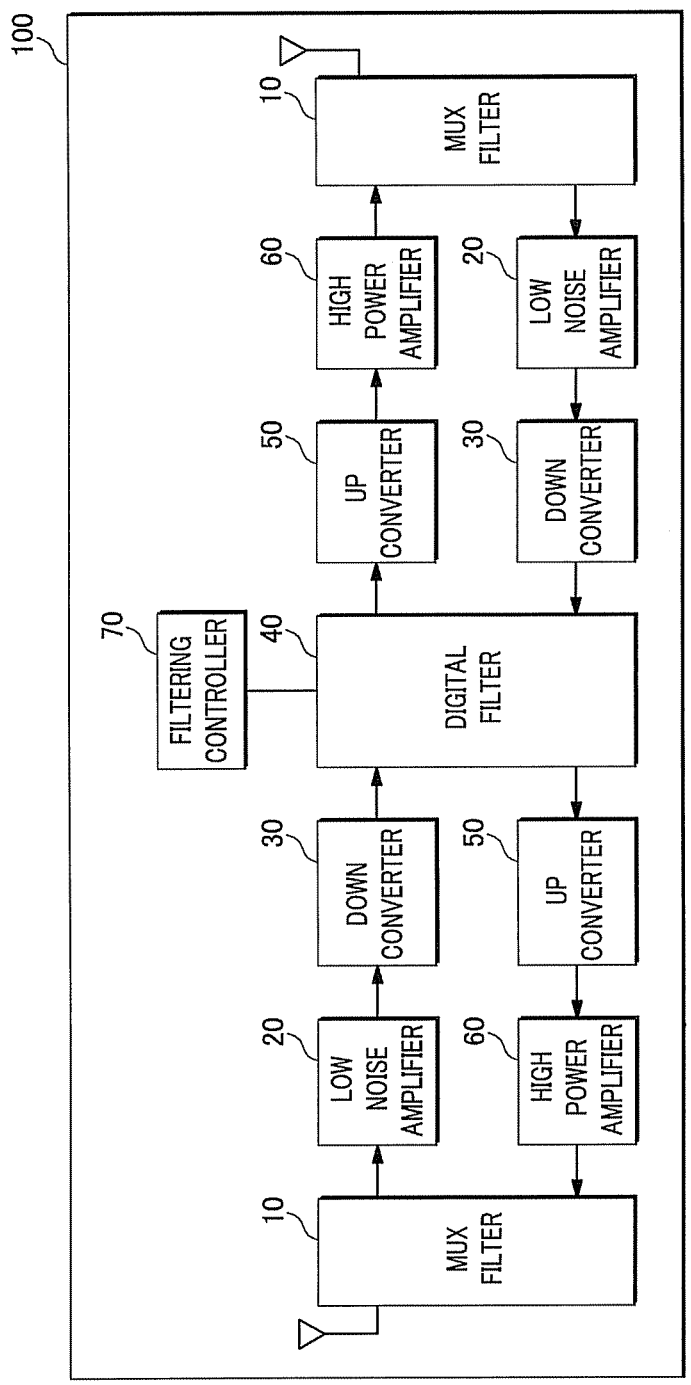
FIG. 1 is a conceptual view of a repeater using a digital filter in accordance with an illustrative embodiment.

Hereinafter, illustrative embodiments will be described in detail with reference to the accompanying drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" include both a case where an element is "directly connected or coupled to" another element and a case where an element is "electronically connected or coupled to" another element via still another element.

A normal mobile communication repeater is located in a shadow region where a base station signal is not easily transferred. Accordingly, a radio frequency (RF) signal input from a base station through a wired or wireless network is received to the repeater through a donor antenna. Thereafter, the RF signal is amplified by a certain gain value and retransmitted to a terminal through a service antenna so that the propagation shadow region is overcome. An illustrative embodiment provides such a repeater.

Hereinafter, illustrative embodiments will be described in detail with reference to the accompanying drawings.

FIG. 1 is a conceptual view of a repeater using a digital filter in accordance with an illustrative embodiment.

With reference to FIG. 1, a repeater 100 using a digital filter in accordance with an illustrative embodiment includes a MUX filter 10, a low noise amplifier 20, a down converter 30, a digital filter 40, an up converter 50, a high power amplifier 60, and a filtering controller 70.

The MUX filter 10 receives an RF signal received through an antenna. Exemplarily, the RF signal may have two or more information on an identical channel. The MUX filter filters the RF signal having the multiple number of information by time-division or frequency-division, and thereafter, sends the signal to the low noise amplifier 20. The MUX filter 10 also receives outcomes filtered in the digital filter 40, which will be described later, and combines the outcomes into one to make one signal. Thereafter, the MUX filter 10 transfers the signal to an antenna.

The low noise amplifier 20 removes noise of a power of the signal outputted from the MUX filter 10 and amplifies the power.

The down converter 30 converts the RF signal outputted from the low noise amplifier 20 into an intermediate frequency (IF) signal. The IF signal is converted into a digital signal by an analog/digital (A/D) converter that may be included in the digital filter 40, which will be described later.

The digital filter 40 executes filtering for the digital signal outputted from the down converter 30 based on parameters inputted by the user. In this case, the digital filter 40 may include a digital/analog (D/A) converter, the signal filtered from the digital filter 40 may be a analog form signal.

The up converter 50 converts the signal filtered in the digital filter 40 into an RF band signal. If the analog form signal is inputted from the digital filter 40 to the up converter 50, the up converter 50 converts the analog form signal into the RF signal.

The high power amplifier 60 can amplify the signal outputted from the up converter 50 to a maximum power of the system.

The filtering controller 70 controls the digital filter 40 by using a filtering coefficient calculated based on parameters inputted by the user. The filtering controller 70 adjusts a bandwidth, a center frequency, and the number of channels for a digital signal based on bandwidth information, frequency information, and the number of channels, which are inputted by the user.

Detailed configuration in this regard will be described later with reference to the drawings.

Figure 2:
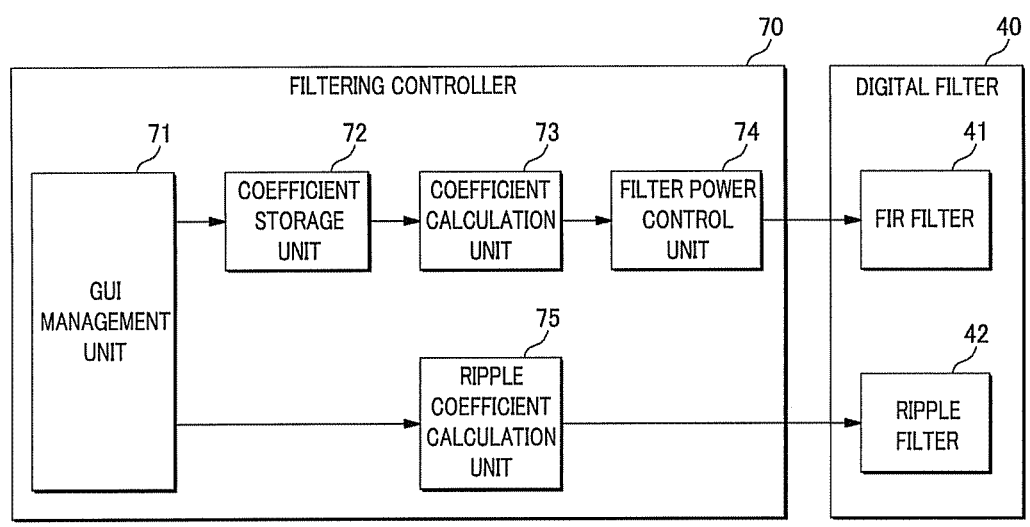
FIG. 2 is a conceptual view of a digital filter and a filtering controller in accordance with an illustrative embodiment.

FIG. 2 is a conceptual view of a digital filter and a filtering controller in accordance with an illustrative embodiment.

With reference to FIG. 2, the digital filter 40 includes a finite impulse response (FIR) filter 41 and a ripple filter 42. The filtering controller 70 includes a GUI management unit 71, a coefficient storage unit 72, a coefficient calculation unit 73, a filter power controller 74, and a ripple coefficient calculation unit 75.

The GUI management unit 71 receives parameter information inputted by the user.

The coefficient storage unit 72 stores coefficient values for a bandwidth, a frequency, and the number of channels.

The coefficient calculation unit 73 calculates changed coefficient values for parameters inputted by the user based on the coefficient values stored in the coefficient storage unit 72.

Based on the values calculated in the coefficient calculation unit 73, the filter power controller 74 controls a signal filtered in the FIR filter 41 included in the digital filter 40.

The ripple coefficient calculation unit 75 receives a parameter of ripple input in the GUI management unit 71 to calculate a ripple coefficient, and transfers a ripple coefficient value to the ripple filter 42 included in the digital filter 40 to filter a value for ripple.

Although not illustrated in the drawings, exemplarily, the digital filter 40 may include an A/D converter that modulates a signal down converted in the down converter 30 to digital data, a buffer that improves a timing characteristic of the signal modulated to the digital data, a DC offset remove that removes a DC component of the signal outputted from the buffer, a digital gain block that compensates a gain of the signal, and a D/A converter that converts the digitalized signal into an analog signal.

Hereinafter, there will be described a process of calculating a coefficient value to filter a signal in the digital filter 40 using an algorithm and a calculation function in the filtering controller 70.

Exemplarily, the coefficient storage unit 72 may include an algorithm and a calculation function to determine a coefficient for each of a bandwidth, a frequency, and the number of channels to be filtered in the digital filter 40.

Specifically, if a bandwidth parameter is inputted in the GUI management unit 71, the coefficient calculation unit receives a bandwidth coefficient from the coefficient storage unit 72 and may generate a low pass filter coefficient having OHz as a center frequency using a remez exchange algorithm.

If a center frequency information as a parameter is inputted in the GUI management unit 71, the coefficient calculation unit 73 receives a frequency coefficient from the coefficient storage unit 72 and may generate a band pass filter coefficient through frequency shifter algorithm calculation together with the low pass filter coefficient.

The band pass filter coefficient can be calculated by changing the center frequency through the calculation formula of CoefBPF(N)=COS 2πFc(N)*CoefLPF(N).

If parameters of the number of channels are inputted in the GUI management unit 71, the coefficient calculation unit 73 receives a coefficient for the number of channels from the coefficient storage unit 72 and generates as many algorithm trees as the input parameters thereby obtaining an outcome, each of the algorithm trees, which includes the remez exchange algorithm, the frequency shifter algorithm, and the calculation formula of CoefBPF(N)=COS 2πFc(N)*CoefLPF(N).

Figure 3:
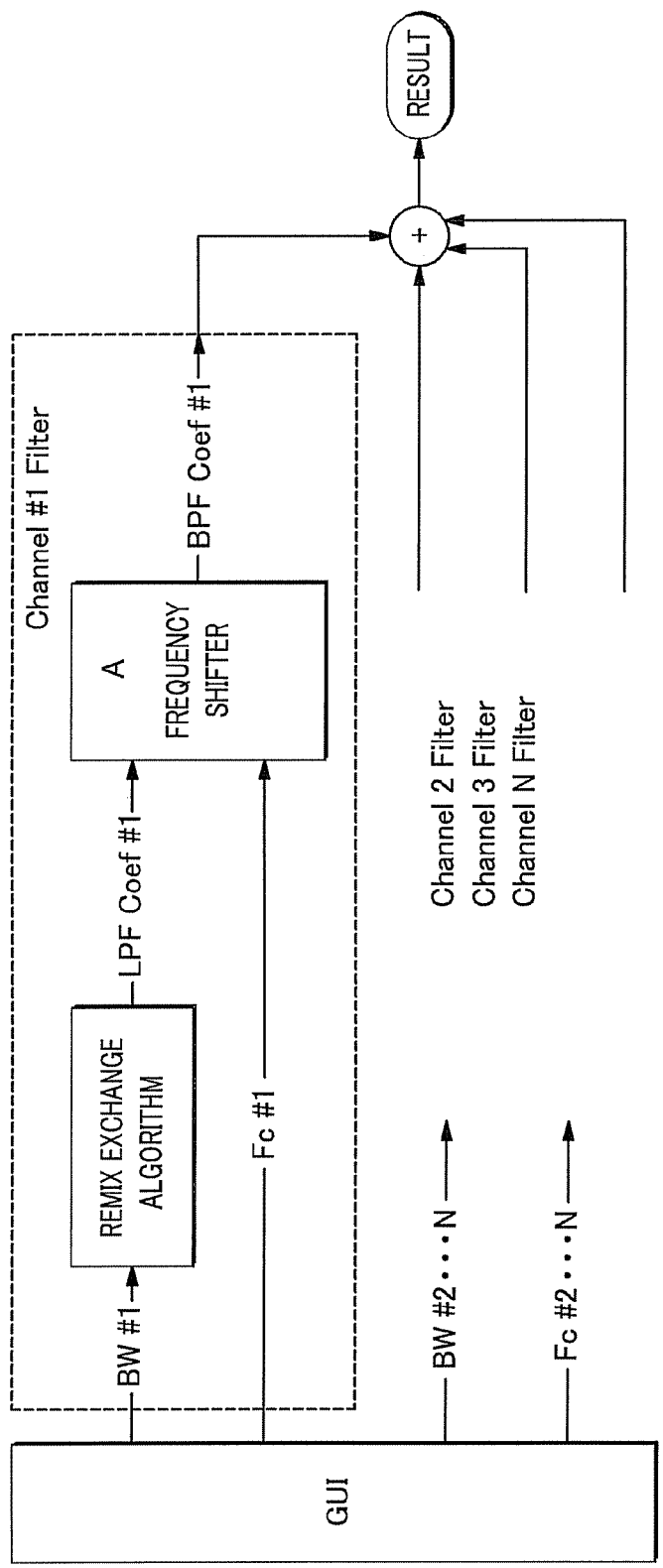
FIG. 3 is a diagram of a function of a filtering controller for embodiment of bandwidth information, frequency information, and information of the number of channels in accordance with an illustrative embodiment.

FIG. 3 is a diagram of a function of a filtering controller to realize bandwidth information, frequency information, and information of the number of channels in accordance with an illustrative embodiment.

With reference to FIG. 3, it is possible to see information about calculation of coefficient values through the algorithm and the calculation function of the filtering controller 70. Exemplarily, once a first parameter (BW#1) of bandwidth information is inputted through the GUI management unit 71, a first low pass filter coefficient (LPF Coef#1) having 0Hz as a center frequency is generated through the remez exchange algorithm.

In this case, a value of the first low pass filter coefficient is a half value (BW/2) of the input bandwidth information. The value of the first low pass filter coefficient obtained through the remez exchange algorithm constructs a first final band pass filter coefficient (BPF Coef#1) through the frequency shifter algorithm. In this case, a parameter is center frequency information (Fc#1) inputted through the GUI management unit 71. The calculation formula to construct the band pass filter coefficient by changing the center frequency is as follows:

$$\text{Coef}_{BPF}(N) = \text{COS } 2\pi Fc(N) s \text{Coef}_{LPF}(N) \quad \text{equation 1}$$

As to parameters for the number of channels, once a desired number of channels are inputted through the GUI management unit 71, N algorithm trees are generated. A bandwidth parameter and frequency information for each of the N algorithm trees are input. N filter outcomes generated through the algorithm are combined together in the MUX filter 10 so that an outcome is output.

With reference to FIG. 2, the coefficient calculation unit 73 may calculate a frequency, the number of channels, and a bandwidth depending on parameters inputted from the outside through the GUI management unit 71 based on the algorithm and the calculation function stored in the coefficient storage unit 72.

To exemplarily and briefly explain the process of filtering a signal in the digital filter 40, as to a filter coefficient of the FIR filter 41, a bandwidth and a frequency can be changed in a unit of minimum 10 kHz depending on parameters inputted through the GUI management unit 71, and N bands can be selected. The coefficient calculation unit 73 selects a filter coefficient having a pre-stored basic filter characteristic depending on parameters inputted by the user and a corresponding band size in the coefficient storage unit 72, and moves a frequency to generate a desired filter coefficient. In this case, a filter coefficient of each of the bands is generated depending on the number of bands selected by the user. The generated filter coefficients are combined together to calculate a final filter coefficient. Thereafter, based on the calculated coefficient, information is sent to the FIR filter 41 through the filter output controller 74 to control filtering.

Hereinafter, there will be described a digital filtering method of a digital filter used in the repeater 100 using the digital filter. Like reference numerals denote like parts throughout the whole document. The overlapping descriptions will be summarized or omitted.

Figure 4:
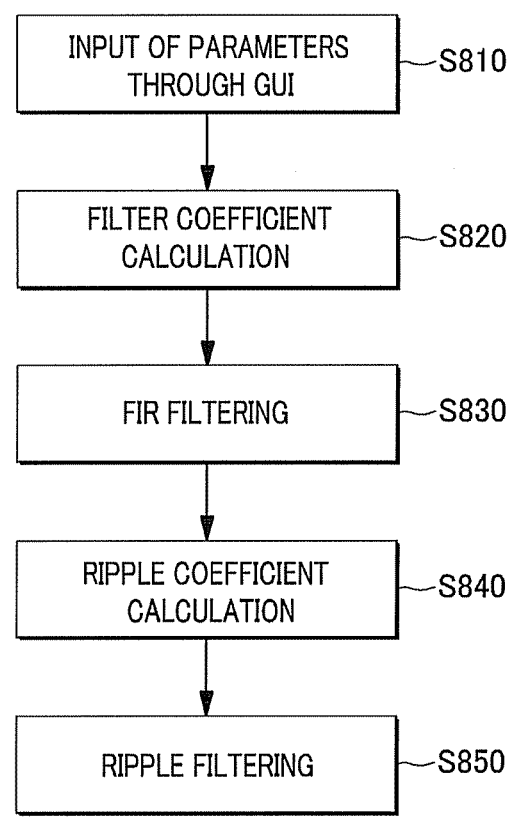
FIG. 4 is a sequence view of a digital filtering method in accordance with an illustrative embodiment.

FIG. 4 is a sequence view of a digital filtering method in accordance with an illustrative embodiment.

With reference to FIG. 4, a digital filtering method in accordance with an illustrative embodiment includes inputting parameters through the GUI management unit 71 (S810), calculating a filter coefficient based on the input parameters (S820), executing filtering in the FIR filter 41 through the calculated filter coefficient (S830), calculating a ripple coefficient of a signal filtered in the FIR filter (S840), and filtering a signal for a filter coefficient value of the ripple filter 42 through the calculated ripple coefficient (S850). The process of calculating a filter coefficient based on the input parameters (S820) includes receiving input of at least one parameter of a bandwidth, a frequency, and the number of channels in the GUI management unit 71 to calculate a filter coefficient through the coefficient calculation unit 73.

Exemplarily, in the process of calculating a filter coefficient based on the input parameters (S820), once a bandwidth parameter is input in the GUI management unit 71, a low pass filter coefficient having 0Hz as a center frequency can be generated through the remez exchange algorithm.

In the process of calculating a filter coefficient based on the input parameters (S820), a band pass filter coefficient can be generated through the frequency shifter algorithm calculation together with a low pass filter coefficient generated by receiving input of center frequency information as a parameter in the GUI management unit 71. The band pass filter coefficient can be calculated by changing a center frequency through the calculation formula of CoefBPF(N)=COS 2πFc(N)*CoefLPF(N).

In the process of calculating a filter coefficient based on the input parameters (S820), an outcome can be obtained by receiving input of parameters of the number of channels in the GUI management unit 71 and generating as many algorithm trees as the input parameters, each of the algorithm trees, which includes the remez exchange algorithm, the frequency shifter algorithm, and the calculation formula of CoefBPF(N)=COS 2πFc(N)*CoefLPF(N). This process can be understood from FIG. 3.

The ripple filter 42 improves a ripple characteristic by changing a gain value of each frequency depending on parameters inputted by the user through the GUI, and sends the calculated value to the ripple filter through the ripple coefficient calculation unit 75.

To exemplarily and briefly explain the filtering process in the ripple filter 42, a signal outputted from the FIR filter 41 passes through the ripple filter 42. In this case, a ripple characteristic is improved by changing a gain value for each frequency depending on parameters inputted by the user through the GUI management unit 71. The ripple coefficient calculation unit 75 can individually change gain values in a unit of a band size obtained by dividing half of a sampling frequency into 16 stages depending on parameters inputted by the user. Filter coefficients according to the changed gain values are generated and sent to the ripple filter 42.

The above description of the illustrative embodiments is provided for the purpose of illustration, and it would be understood by those skilled in the art that various changes and modifications may be made without changing technical conception and essential features of the illustrative embodiments.

Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A repeater using a digital filter, the repeater comprising:
a MUX filter for filtering an RF signal received through an antenna or a signal to be transmitted through the antenna;
a low noise amplifier for lowering noise of the signal filtered by the MUX filter;
a down converter for converting the signal outputted from the low noise amplifier into an IF band signal to digitalize the signal;
a digital filter for filtering the digital signal outputted from the down converter based on parameters inputted by a user;
a filtering controller for controlling the digital filter by using a filtering coefficient calculated based on the parameters;
an up converter for converting the signal filtered by the digital filter into an RF band signal; and
a high power amplifier for amplifying the signal outputted from the up converter to a high power signal,
wherein the filtering controller adjusts a bandwidth, a center frequency, and the number of channels of a digital signal to be filtered based on bandwidth information, frequency information, and the number of channels, which are inputted by the user.

2. The repeater of claim 1,
wherein the filtering controller comprises:
a coefficient storage unit for storing coefficient values for a bandwidth, a frequency, and the number of channels;
a coefficient calculation unit for calculating changed coefficient values by comparing the parameters inputted by the user with the coefficient values stored in the coefficient storage unit;
a filter power controller for controlling the signal filtered in the digital filter based on the values calculated in the coefficient calculation unit; and
a GUI management unit for receiving parameter information inputted by a user through GUI.

3. The repeater of claim 2,
wherein the coefficient storage unit stores an algorithm and a calculation function to determine a coefficient for each of a bandwidth, a frequency and the number of channels to be filtered in the digital filter.

4. The repeater of claim 3,
wherein the coefficient calculation unit generates a low pass filter coefficient having 0 Hz as a center frequency by processing a bandwidth parameter inputted through the GUI by using a remez exchange algorithm.

5. The repeater of claim 4,
wherein the coefficient calculation unit generates a band pass filter coefficient by processing center frequency information inputted through the GUI and the generated low pass filter coefficient by using a frequency shifter algorithm.

6. The repeater of claim 5,
wherein the band pass filter coefficient is calculated by changing the center frequency through the following equation:

$$\text{Coef}_{BPF}(N) = \cos 2\pi Fc(N) s \text{Coef}_{LPF}(N).$$

7. The repeater of claim 5,
wherein the coefficient calculation unit generates as many algorithm trees as the input number of channels based on parameters for the number of channels inputted through the GUI, wherein each of the algorithm trees including the remez exchange algorithm, the frequency shifter algorithm, and the calculation formula.

8. The repeater of claim 2,
wherein the coefficient calculation unit calculates a frequency, the number of channels, and a bandwidth for the digital signal to be filtered based on the algorithm and the calculation function stored in the coefficient storage unit.

9. A digital filtering method comprising:
calculating a filter coefficient based on parameters inputted by a user;
filtering an input RF signal in an FIR filter using the calculated filter coefficient;
calculating a ripple coefficient of the signal filtered from the FIR filter; and
filtering a ripple with a ripple filter using the calculated ripple coefficient,
wherein the calculating the filter coefficient comprises calculating the filter coefficient in a coefficient calculation unit based on at least one parameter of a bandwidth, a frequency information, and the number of channels, which are inputted by a user through GUI.

* * * * *